United States Patent
Mueller (10) Patent No.: US 10,027,476 B2
(45) Date of Patent: Jul. 17, 2018

(54) METHOD FOR GENERATING A SECRET OR A KEY IN A NETWORK

(71) Applicant: Robert Bosch GmbH, Stuttgart (DE)

(72) Inventor: Andreas Mueller, Waiblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 44 days.

(21) Appl. No.: 15/306,604

(22) PCT Filed: Apr. 21, 2015

(86) PCT No.: PCT/EP2015/058598
§ 371 (c)(1),
(2) Date: Oct. 25, 2016

(87) PCT Pub. No.: WO2015/165775
PCT Pub. Date: Nov. 5, 2015

(65) Prior Publication Data
US 2017/0048063 A1  Feb. 16, 2017

(30) Foreign Application Priority Data

Apr. 28, 2014 (DE) .......... 10 2014 207 936
Apr. 21, 2015 (DE) .......... 10 2015 207 220

(51) Int. Cl.
*H04L 9/00* (2006.01)
*H04L 9/08* (2006.01)
(Continued)

(52) U.S. Cl.
CPC .............. *H04L 9/0838* (2013.01); *G09C 1/00* (2013.01); *H04L 9/0816* (2013.01);
(Continued)

(58) Field of Classification Search
CPC ... H04L 9/0838; H04L 9/0869; H04L 9/0816; H04L 63/162; H04L 63/06; H04L 12/40;
(Continued)

(56) References Cited

U.S. PATENT DOCUMENTS

2009/0103726 A1* 4/2009 Ahmed ............... H04L 9/0668
380/46
2013/0132548 A1* 5/2013 Cabos .................. H04L 67/16
709/223

FOREIGN PATENT DOCUMENTS

DE   102009002396   10/2010
DE   102009045133   3/2011
(Continued)

OTHER PUBLICATIONS

Robert Bosch Gmbh, "CAN Specification Version 2.0," Stuttgart, Germany, Sep. 1, 1991; pp. 1-69.
(Continued)

*Primary Examiner* — Mohammed Waliullah
(74) *Attorney, Agent, or Firm* — Norton Rose Fulbright US LLP; Gerard Messina (57) ABSTRACT

A method for generating a secret or a key in a network, the network including at least one first and one second member and a transmission channel between at least the first and the second members. The first and second members being able to place at least one first value and one second value on the transmission channel. The first member causes a first member value sequence and the second member causes a second member value sequence to be transmitted over the transmission channel largely synchronously with each other. The first member and the second member generate a shared secret or a shared key on the basis of information about the first member value sequence and the second member value sequence and on the basis of an overlap value sequence (Continued)

resulting from the overlap of the first member value sequence with the second member value sequence on the transmission channel.

21 Claims, 4 Drawing Sheets

(51) Int. Cl.
*H04L 29/06* (2006.01)
*G09C 1/00* (2006.01)
*H04L 12/40* (2006.01)
*H04L 29/08* (2006.01)

(52) U.S. Cl.
CPC ............ *H04L 9/0869* (2013.01); *H04L 63/06* (2013.01); *H04L 63/162* (2013.01); *H04L 12/40* (2013.01); *H04L 63/0435* (2013.01); *H04L 63/0442* (2013.01); *H04L 67/12* (2013.01); *H04L 69/22* (2013.01); *H04L 2012/40215* (2013.01); *H04L 2012/40234* (2013.01)

(58) Field of Classification Search
CPC ....... H04L 63/0442; H04L 2012/40234; H04L 67/12; H04L 69/22; H04L 63/0435; H04L 2012/40215; G09C 1/00
USPC .......................................................... 380/46
See application file for complete search history.

(56) References Cited

FOREIGN PATENT DOCUMENTS

DE 102012215362 2/2013
DE 102012215326 3/2014

OTHER PUBLICATIONS

International Organization for Standardization, "Road vehicles, Controller area network (CAN)—part 1. Data link layer and physical signaling," Nov. 18, 2010, pp. 1-52.
International Search Report, dated Jul. 16, 2015, in PCT International Application No. PCT/EP2015/058598 filed Apr. 21, 2015.
Anonymous, "On-off keying," Wkipedia, Apr. 21, 2014, pp. 1-2.

* cited by examiner

METHOD FOR GENERATING A SECRET OR A KEY IN A NETWORK

BACKGROUND INFORMATION

The present invention relates to a method for generating a secret such as a secret cryptographic key in a network, in particular, for generating a shared secret key in two members of the network. Point-to-point connections are also usually considered networks and are treated as such here. The two members communicate via a jointly used transmission medium. Logical bit sequences (or in more general terms: value sequences) are physically transmitted by appropriate transmission methods as signals or signal sequences. The underlying communication system may be a CAN bus, for example, which provides for a transmission of dominant and recessive bits or corresponding dominant and recessive signals, a dominant signal or bit of a member of the network prevailing against recessive signals or bits. A state corresponding to the recessive signal is established in a transmission medium only if all participating members provide a recessive signal for transmission or when all simultaneously transmitting members transmit a recessive signal level.

In an increasingly networked world, secure communication between different devices is becoming increasingly important and in many areas of application represents an important precondition for acceptance and thus also for the economic success of the corresponding applications. Depending on the application, this includes different protection objectives such as, for example, the observance of confidentiality of the data to be transmitted, the mutual authentication of the participating nodes, or the safeguarding of data integrity.

To achieve these protection objectives, suitable cryptographic methods are normally used; these may be generally divided into two categories: on the one hand, symmetric methods, in which sender and receiver have the same cryptographic key; on the other hand, asymmetric methods, in which the sender encrypts the data to be transmitted using a public key of the receiver (i.e., one that is also possibly known to a potential attacker), but decoding may take place only by using the respective private key, which, ideally, is known only to the receiver.

Asymmetric methods have, among others, the disadvantage that they generally feature a very high computing complexity. Therefore, they are only suitable for resource-limited nodes such as, for example, sensors, actuators, and the like, which have a relatively low computing power and a small memory, only under certain conditions, and must operate energy-efficiently, for example, due to battery operation or the use of energy harvesting. In addition, often only a limited bandwidth is available for data transmission, which makes the exchange of asymmetric keys having a length of 2048 bits or more even more unattractive.

In contrast, in symmetric methods it must be ensured that both sender and receiver have the same key. The corresponding key management represents generally a highly challenging task. In the area of wireless communication, keys are introduced into a cell phone with the aid of SIM cards, and the corresponding network may then assign the unique ID of a SIM card to the corresponding key. In the case of wireless LANs, in contrast, the key to be used is input manually (generally by entering a password) when the network is set up. Such a key management, however, quickly becomes complex and impractical in the case of a very high number of nodes, for example, in a sensor network or in other machine-to-machine communication systems, for example, also in CAN-based vehicle networks. In addition, a modification of the keys to be used is often possible only with extreme complexity or not at all.

Methods for protecting sensor data against manipulation and ensuring transaction authentication, for example, in a motor vehicle network, with the help of common encryption methods are described, for example, in German Patent Application Nos. DE 102009002396 A1 and DE 102009045133 A1.

In addition, for some time now other approaches, referred to as "Physical Layer Security," have been researched and developed, with the help of which keys for symmetric methods may be generated automatically on the basis of physical properties of the transmission channels between the nodes involved. In this case, the reciprocity and the inherent randomness of these transmission channels are made use of. However, in particular, in wire-bound or optical systems, this approach is often applicable only conditionally, since the corresponding channels usually have a very limited time variability, and an attacker may make a relatively good guess about the channel parameters between sender and receiver, for example, by building a model.

SUMMARY

The example methods for generating a secret such as a cryptographic key according to the present invention require no manual intervention and thus make automatic build-up of secure communication relations or connections between two nodes possible. In addition, the methods have low complexity, in particular, with regard to the required hardware design such as, for example, the memory resources and computing power needed, and they involve low power and time consumption. The methods also offer very high key generation rates and, at the same time, a low probability of errors.

The methods assume that the members of a network communicate with each other via a communication channel. In particular, they transmit logical value sequences (or, in the case of binary logic, bit sequences) with the aid of physical signals on the transmission channel. Even when possible overlaps of signals take place on the transmission channel, i.e., on the physical level, the following description will mainly deal with the logical level. Therefore, the transmitted logical value sequences and their logical overlap will be discussed.

Therefore, members of the network may place first signals (assigned, for example, to the logical bit "1") and second signals (assigned, for example, to the logical bit "0") on the communication channel and detect resulting signals on the communication channel. If two members now transmit one signal sequence each (largely) simultaneously, the members are able to detect the resulting overlap on the communication channel. The effective signal resulting from the (largely) simultaneous transmission of two (independent) signals on the communication channel may in turn be assigned to one (or multiple) defined logical value(s).

The transmission must be largely synchronous in that an overlap of the individual signals of a signal sequence takes place on the transmission medium, in particular, in that the signal corresponding to the $n^{th}$ logical value or bit of the first member at least partially overlaps with the signal corresponding to the $n^{th}$ logical value or bit of the second member. This overlap should last long enough for the members to be able to detect the overlap and ascertain the corresponding overlap value.

The overlap may be determined by arbitration mechanisms or by physical signal overlap. An arbitration mechanism is, for example, the case where a node intends to apply a recessive level, but a dominant level is detected on the bus and therefore the transmission fails. In this case no physical transmission of two signals occurs, but only the dominant signal remains visible on the transmission channel.

The members may then generate a key, which is secret to an outside attacker, from the resulting value sequence of the overlap and their own value sequence. This is because an outside attacker, who may, for example, intercept the effective total signals on the jointly used transmission medium, sees only the overlap of the value sequences but does not have the information about the individual value sequences of the members. The members therefore have more information, which, unlike the attacker, they may use for generating a secret key.

The method may be used advantageously in particular in a network in which there is a dominant value (physically: a dominant signal), which prevails when only one member applies it to the transmission channel and a recessive value (physically: a recessive signal) which results on the transmission channel only when both (or all) members transmit a recessive value. Due to the overlap rules clearly predefined here, the members of such a network may derive information for generating a key from the resulting overlap sequences in a particularly simple manner. Alternatively, the transmission of a recessive value may be replaced by one of the members by transmitting nothing at this location of the value sequence or as one of the at least two possible values.

The member value sequences, which are placed by the members largely simultaneously on the transmission channel, are generated in advance in the members themselves with the aid of a random generator or pseudo-random generator. Since the resulting overlap sequence may be accessible to a potential attacker on the transmission channel, it is particularly advantageous for the security of the later communication if it is made as difficult as possible for the attacker to guess the individual value sequences of the members by these being generated locally and randomly, or at least pseudo-randomly in the members.

In one preferred variant, the members transmit partial value sequences having a first part and a second part, the second part corresponding to the inverted first part. While for an attacker both parts in the overlap (at least on the logical level) look the same at the locations where both members are transmitting different values, additional information also results for the members about the partial value sequences of the other member. These may in turn be used for generating keys and thus making them more secure. Here it is irrelevant whether the partial value sequences follow each other directly. There may also be interruptions, for example, between the partial value sequences corresponding to the inverted and non-inverted parts of the value sequence as long as both members resume the transmission (largely) simultaneously. The partial value sequences may thus be transmitted either in separate messages or in a single message (for example, first 32 bits=original, second 32 bits=inverted). The members may extract the additional information from the transmission of such messages inverted relative to each other by linking the two resulting parts of the overlap value sequence, in particular, via an OR function.

In an advantageous embodiment of this preferred variant, the members may delete those positions of their member value sequence that have a value identical to a value in the same position of the other member value sequence, and thus obtain a shortened value sequence. The members may derive the information required therefor from the additional information provided by the transmitted inverted value sequences. The positions thus deleted correspond to information that an attacker might derive from the overlap sequence relatively easily (at least when he is familiar with the members' transmission format), which would thus reduce the security of a key generated from the value sequence. By inverting the value sequence thus shortened, one of the members may now obtain a value sequence that corresponds to the value sequence of the other member. The members may now use this shared, secret value sequence as a basis for a shared, secret key.

The above-described methods may be implemented particularly well in a CAN, TTCAN or CAN-FD bus system, where a recessive bus level is suppressed by a dominant bus level. The overlap of values or signals of the members follows fixed rules, which may be used by the members for deriving information from the overlapping value or signal and from the value or signal transmitted by them. Other communication systems such as LIN or I2C are also well suited for the implementation of these methods.

Alternatively, however, the method may also be used in a network having on-off amplitude shift keying, for example. Also in this case, the overlap is determined by the members having the choice of "transmission" and "no transmission" and by the overlap signal corresponding to the "transmission" signal, when one member or both members are transmitting, and to the "no transmission" signal when none of the members is transmitting.

If both members show characteristics in the transmission such as, for example, different signal amplitudes or different signal transmission start times, an attacker may be able to derive information about the individual value sequences of the particular members with the aid of sensitive measurements on the transmission channel. Since this information contains the basis of the secret key, in another preferred embodiment of the method according to the present invention it is made difficult for the attacker to derive this information. For this purpose, at least one of the members varies transmission parameters during the transmission. For example, a different signal amplitude may be selected from one value to another of a value sequence or the transmission start time or end time may be varied from one value to another of a value sequence. This may be a random variation, for example. In this way it is made difficult for an attacker to derive information from the characteristics in the transmission.

While the method has been described for two members in a network, a secret key may already be derived by a single member of a network from its own signal sequence and from the overlap thereof with the signal sequence of a second member. A network or a member of a network is set up for carrying out the steps of such a method in that they have electronic memory and computing resources available. A computer program that is designed for carrying out all steps of such a method may also be stored on a memory medium of such a member or on distributed memory resources of a network when it is run in the member or in the network.

BRIEF DESCRIPTION OF THE DRAWINGS

The present invention is described in greater detail below with reference to the figures based on exemplary embodiments.

DETAILED DESCRIPTION OF EXAMPLE EMBODIMENTS

The present invention relates to a method for generating a secret such as a (secret) symmetric cryptographic keys between two nodes of a communication system (members of a network), which communicate with each other via a jointly used medium (transmission channel of the network). The generation and negotiation of the secret, in particular, of the cryptographic keys, is based on a public data exchange between the two members, it being impossible or very difficult for an eavesdropping third party as attacker to draw a conclusion regarding the generated keys. Using the present invention it is thus possible to establish appropriate symmetric cryptographic keys between two different members of a network fully automatically and safely to then, based thereon, implement certain security functions such as data encryption. As will be described in detail herein, initially a shared secret is established for this purpose, which may be used for generating keys. Such a shared secret may, however, be basically also used for purposes other than for cryptographic keys in the strict sense, for example, as a one-time pad.

The present invention is suitable for a plurality of wire-bound or wireless, as well as for optical networks or communication systems, in particular, also for systems where the different members communicate with each other via a linear bus and the medium access to this bus takes place via a bit-by-bit bus arbitration. This principle represents, for example, the basis of the widely used CAN bus. Possible areas of application of the present invention therefore include also CAN-based vehicle networks, as well as CAN-based networks in automation technology.

The present invention describes an approach, using which symmetric cryptographic keys in one node or, in particular, between two nodes of a network may be generated in a fully automated manner. This generation takes place using properties of the corresponding transmission layer. Non-physical parameters of the transmission channel such as transmission power are, however, evaluated using other than the established approaches of the "physical layer security." Rather, there is a public data exchange between the nodes involved for this purpose, which, thanks to the properties of the communication system and/or of the modulation method used, allows a possible eavesdropping attacker to draw no, or no sufficient conclusions about the key thus negotiated.

Figure 1:
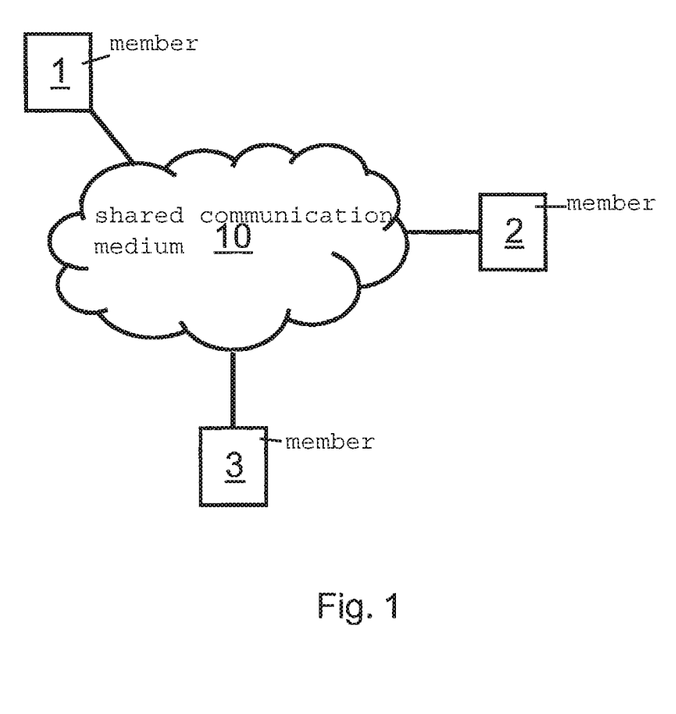
FIG. 1 schematically shows an exemplary underlying communication system.

In the following, a system such as illustrated in principle in FIG. 1 will be discussed, in which different members 1, 2, and 3 communicate with each other via a so-called shared transmission medium 10. In one advantageous embodiment of the present invention, this shared transmission medium corresponds to a (wire-bound or optical) linear bus 30, as shown as an example in FIG. 2. Network 20 in FIG. 2 includes just such a linear bus 30 as shared transmission medium (for example, as a wire-bound transmission channel), members or nodes 21, 22, and 23, as well as (optional) bus terminations 31 and 32.

Figure 2:
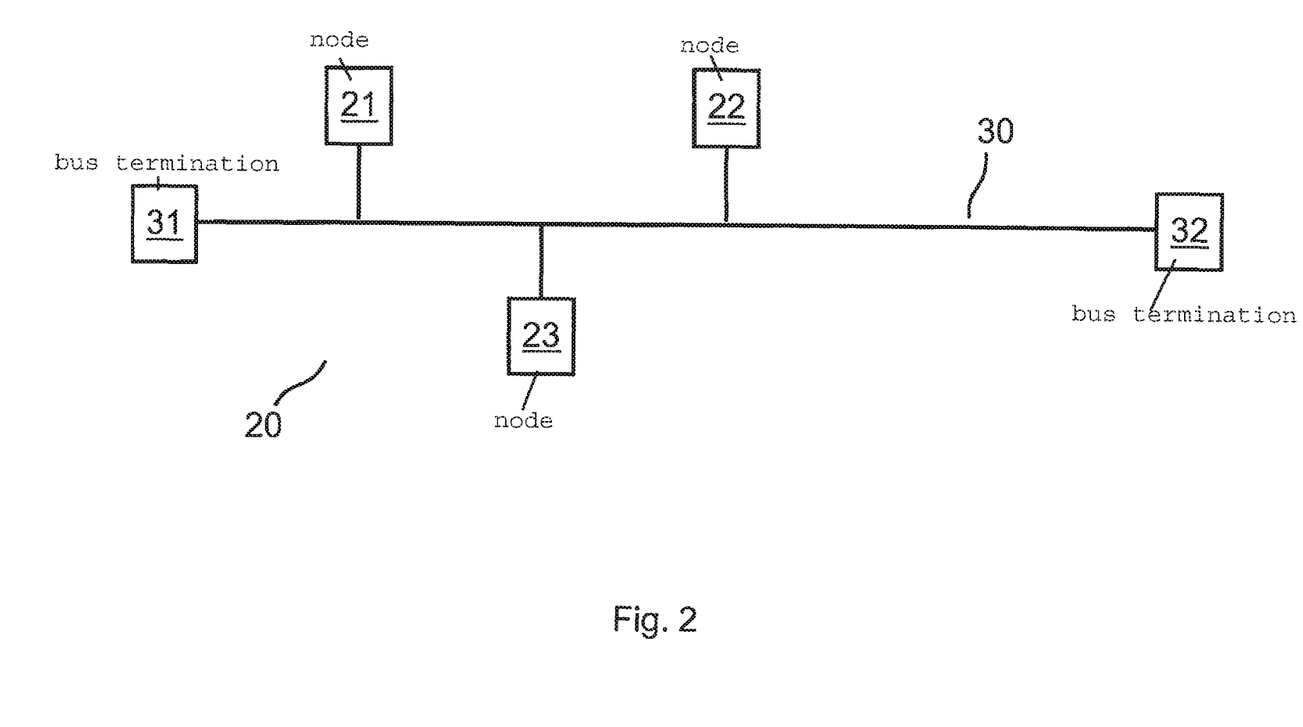
FIG. 2 schematically shows a linear bus as an example of an underlying communication system.

In the following it will be assumed for the communication between the different nodes 21, 22, and 23, that it is characterized by the distinction made between dominant and recessive values. In this example, the bits "0" and "1" are assumed as possible values. A dominant bit (for example, logical bit "0") may virtually suppress or overwrite a recessive bit (for example, logical bit "1") transmitted at the same time.

One example of such a transmission method is the so-called on-off amplitude shift keying in which a distinction is made between exactly two transmission states: in the first case ("on" value or "0") a signal is transmitted, for example, in the form of a simple carrier signal; in the other case ("off" value or "1"), no signal is transmitted. The "on" state is dominant, while the "off" state is recessive.

Another example of such a communication system, which supports this distinction between dominant and recessive bits, is a (wire-bound or optical) system based on a bit-by-bit bus arbitration such as that used, for example, in the CAN bus. The basic idea here is also that when, for example, two nodes wish to transmit a signal simultaneously, and one node transmits a "1," while the second node transmits a "0," "0," i.e., the dominant bit "wins," i.e., the signal level which is measurable on the bus corresponds to a logical "0." In CAN, this mechanism is used, in particular, for resolving possible collisions. Higher priority messages (i.e., messages having an earlier, dominant signal level) are preferentially transmitted in that each node monitors the signal level on the bus bit-by-bit simultaneously when transmitting its CAN identifier. If the node itself transmits a recessive bit, but a dominant bit is detected on the bus, the corresponding node aborts its transmission attempt in favor of the higher-priority message (having the earlier dominant bit).

The distinction between dominant and recessive bits allows the shared transmission medium to be considered a type of binary operator, which links the different input bits (=all simultaneously transmitted bits) together with the help of a logical AND function.

Figure 3:
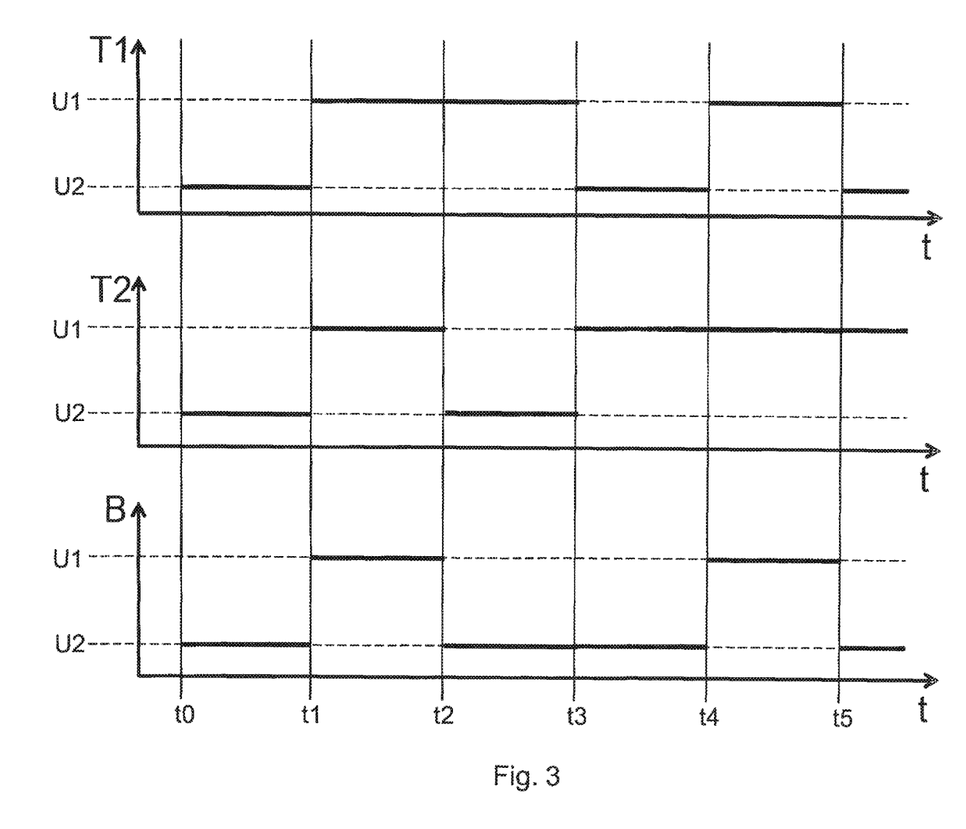
FIG. 3 schematically shows exemplary signal sequences of two members of a network and a resulting overlap value sequence on a transmission channel between the members.

FIG. 3 shows as an example how a member 1 (T1) keeps the bit sequence 0,1,1,0,1 ready for transmission over the transmission channel between points in time to and t5. Member 2 (T2) keeps the bit sequence 0,1,0,1,1 ready for transmission over the transmission channel between points in time t0 and t5. With the above-described properties of the communication system and assuming that in this example the bit level "0" is the dominant bit, the bit sequence 0,1,0,0,1 is to be seen on the bus (B). Only between points in time t0 and t2, as well as between t4 and t5 do both member 1 (T1) and member 2 (T2) provide a recessive bit "1," so that only here does the logical AND link result in a "1" bit level on the bus (B).

Making use of these properties of the transmission method of the communication system, a key may now be generated between two members of such a network in that the members detect an overlap of bit sequences of both members on the transmission medium and jointly generate a shared (symmetric) secret key from this information together with information about the bit sequence they have transmitted.

Figure 4:
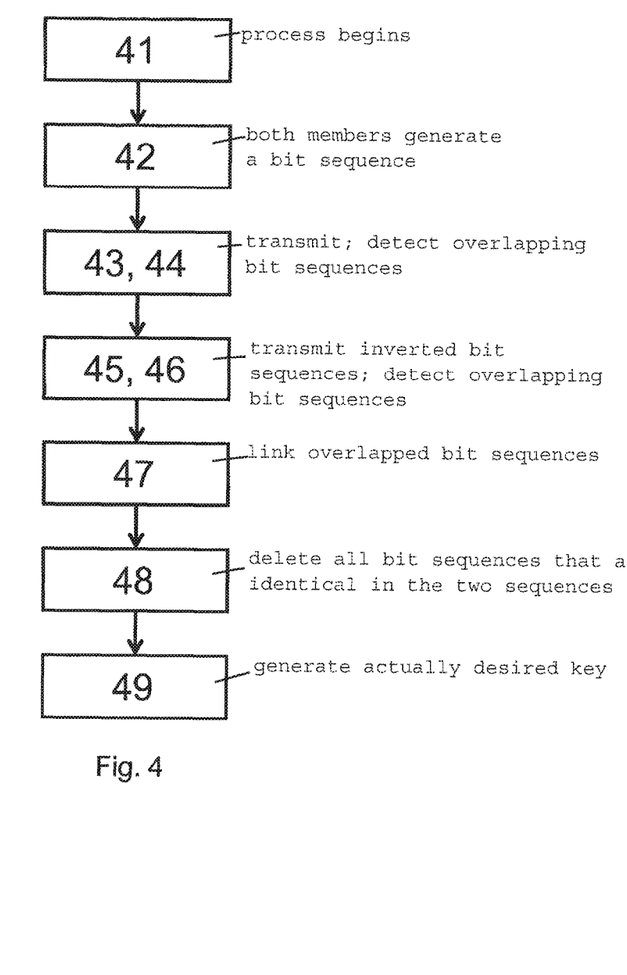
FIG. 4 schematically shows the sequence of an exemplary method for generating keys between two members of a network.

One exemplary, particularly preferred embodiment is described in detail below with reference to FIG. 4.

The process for generating a symmetric pair of keys is started in step 41 by one of the (in this example) two nodes involved (member 1 and member 2). This may take place by sending a special message or a special message header.

Both member 1 and member 2 generate a bit sequence initially locally (i.e., internally and independently of each other) in step 42. This bit sequence is preferably at least twice, in particular, at least three times as long as the desired shared key as the result of the procedure. The bit sequence is preferably generated as a random or pseudo-random bit sequence, for example, with the aid of a suitable random number generator or pseudo-random number generator.

Example of 20 bit long local bit sequences:
* bit sequence generated by member 1:
$S_{T1}$=01001101110010110010
* bit sequence generated by member 2:
$S_{T2}$=10010001101101001011

In a step 43, member 1 and member 2 transmit their respective generated bit sequences to each other (largely) synchronously via the shared transmission medium (using the transmission method featuring dominant and recessive bits as explained above). Different options for synchronizing the respective transmissions are possible. Thus, for example, either member 1 or member 2 may initially transmit a suitable synchronization message to the other node and, after a certain time period, after the full transmission of this message, start the transmission of the actual bit sequences. However, it is likewise possible that only one suitable message header is transmitted by one of the two nodes (for example, a CAN header including an arbitration field and a control field), and during the respective payload phase both nodes may then simultaneously transmit their generated bit sequences (largely) synchronously. In one variant of the method, the bit sequences of one member, generated in step 42, may be transmitted in step 43 divided into multiple messages, for example, when the (maximum) size of the corresponding messages makes this necessary. Also in this variant, the appropriate number of bit sequences divided into messages of the appropriate size of the other member is transmitted (largely) synchronously.

Both bit sequences overlap on the shared transmission medium when, due to the previously required property of the system with a distinction between dominant and recessive bits, the individual bits of member 1 and member 2 yield an overlap; in this example they become actually AND linked. This results in an overlap on the transmission channel, which could be detected, for example, by an eavesdropping third member.

Example of an overlap bit sequence for the above local bit sequences:
* Effective bit sequence on the transmission channel:
$S_{eff}$=$S_{T1}$ AND $S_{T2}$=00000001100000000010

During the transmission of their bit sequences of step 43, both member 1 and member 2 detect the effective (overlapping) bit sequences $S_{eff}$ on the shared transmission medium in a simultaneous step 44. For the example of the CAN bus, this also usually takes place anyway in conventional systems during the arbitration phase.

For on-off keying systems (wireless, wire-bound or optical), this is also similarly possible. It is advantageous in particular for practical feasibility that in such a system the "on" state is dominant and the "off" state is recessive (as explained above). Consequently, a node knows, even without measuring, that the effective state on the shared medium is dominant if the node itself has sent a dominant bit. In contrast, if the node has sent a recessive bit, initially it does not readily know the state on the shared transmission medium; however, in this case it may determine the state of the medium using a suitable measurement. Since the node itself is sending nothing in this case, there is also no problem with so-called self-interference, which otherwise would require a complicated echo compensation, especially in the case of wireless systems.

In a next step 45, both member 1 and member 2 transmit their initial, this time inverted, bit sequences $S_{T1}$ and $S_{T2}$ again (largely) synchronously. The corresponding transmissions may be synchronized again in the same way as described above. Both sequences are AND-linked to each other again on the shared communication medium. Members 1 and 2 again ascertain the effective overlapped bit sequences $S_{eff}$ on the shared transmission medium.

Example of the above bit sequences:
* inverted bit sequence of member 1
$S_{T1'}$=10110010001101001101
* inverted bit sequence of member 2:
$S_{T2'}$=01101110010010110100
* effective, overlapped bit sequence on the channel:
$S_{eff'}$=$S_{T1'}$ AND $S_{T2'}$=00100010000000000100

During the transmission of their now inverted bit sequences, both member 1 and member 2 ascertain again the effective, overlapped bit sequences on the shared transmission medium. At this point in time, both nodes (member 1 and member 2) and also a possible attacker, for example, member 3, who eavesdrops on the communication on the shared transmission medium, thus know the effective, overlapped bit sequences $S_{eff}$ and $S_{eff'}$. However, unlike the attacker or third member, member 1 still knows its initially generated local bit sequence $S_{T1}$, and member 2 still knows its initially generated local bit sequence $S_{T2}$. However, member 1 does not know the initially generated local bit sequence of member 2, and member 2 does not know the initially generated local bit sequence of member 1. The overlap bit sequence is again detected during the transmission in step 46.

Alternatively to this exemplary embodiment variant, member 1 and member 2 may send their inverted local bit sequence also directly with or directly after their original local bit sequence, i.e., steps 45 and 46 may take place together with steps 43 and 44. The original and the inverted bit sequences may be transmitted in one message, but also in separate messages as partial bit sequences.

In step 47, member 1 and member 2 link the effective, overlapped bit sequences ($s_{eff}$ and $S_{eff'}$) now locally (i.e., internally), in particular, using a logical OR function.

Example of the above bit sequences:
$S_{tot}$=$S_{eff}$ OR $S_{eff'}$=00100011100000000110

The individual bits in the bit sequence resulting from the OR linkage $S_{tot}$ now indicate whether the corresponding bits of $S_{T1}$ and $S_{T2}$ are identical or different. If the $n^{th}$ bit within $S_{tot}$ is a "0," for example, this means that the nth bit within $S_{T1}$ is inverse to the corresponding bit within $S_{T2}$. In the same way, when the $n^{th}$ bit within $S_{tot}$ is a "1," the corresponding bits within $S_{Alice}$ and $S_{Bob}$ are identical.

In step 48, based on bit sequence $S_{tot}$ resulting from the OR linkage, member 1 and member 2 then delete all bits in their original bit sequences $S_{T1}$ and $S_{T2}$ that are identical in the two sequences. This consequently results in shortened bit sequences.

Example of the above bit sequences:
* shortened bit sequence of member 1:
$S_{T1,V}$=01011100101100
* shortened bit sequence of member 2:
$S_{T2,V}$=10100011010011

The resulting shortened bit sequences $S_{T1,V}$ and $S_{T2,V}$ are now each other's inverses. One of the two members may thus ascertain, by inverting its shortened bit sequence, exactly that shortened bit sequence which is present in the other member.

The shared shortened bit sequence thus present is now prepared by member 1 and member 2 in step 49 locally as appropriate to generate the actually desired key of the desired length N. Also in this case, there are a plurality of options for this preparation. One option is the selection of N bits from the shared shortened bit sequence present, where it must be clearly defined which N bits are to be selected, for example, by simply always selecting the first N bits of the sequence. It is also possible to calculate a hash function over the shared shortened bit sequence present, which yields an N bit long hash value. In general, the preparation may be performed using any linear or non-linear function that yields back an N bit long bit sequence when applied to the shared shortened bit sequence present. The mechanism of generating a key from the shared shortened bit sequence present is preferably equally available in both members 1 and 2 and is carried out in the same way.

After generating the keys, it may be verified, if necessary, that the keys generated by member 1 and 2 are in fact identical. A check sum from the keys generated may be calculated, for example, for this purpose and exchanged between member 1 and member 2. If the two check sums are not identical, something is obviously wrong. In this case, the above-described procedure for generating keys may be repeated.

In one preferred variant of the method for generating a key, initially a series of resulting shortened bit sequences present in member 1 and member 2 may be generated in different runs; these sequences are then combined into a single large sequence before the actual key is derived therefrom. This may also take place adaptively if necessary. If, after the single run of the above-described procedure, the length, for example, of the shared shortened bit sequence is smaller, for example, than the desired key length N, further bits may be generated in a repeated run, for example, before actually deriving the key.

The generated symmetric pair of keys may now finally be used by member 1 and member 2 in the established (symmetric) cryptographic method such as, for example, encoding for data encryption.

One object of linking the two overlap partial value sequences, in particular, with the aid of a logical OR function, is to be able to delete those bits that even a passive attacker who observes the communication may easily ascertain on the basis of its observations. One alternative would be to keep those bits, but to initially generate more bits than desired (i.e., for example, if a 128-bit secret or key is desired, to initially generate 300 bits) and then to reduce them to the desired length at the end, for example, with the aid of a hash function or the like.

A possible attacker (for example, member 3) may eavesdrop on the public data transmission between member 1 and member 2 and thus, as described above, become aware of the effective overlapped bit sequences ($S_{eff}$ and $S_{eff}'$). However, the attacker thus will know only which bits are identical in the locally generated bit sequences of member 1 and member 2, and which are not. In the case of identical bits, the attacker may also determine whether it is a "0" or a "1." However, for full knowledge of the resulting shortened bit sequence (and thus the basis for generating the key) it lacks information about the non-identical bits. To make possible attacks even more difficult for the attacker, in a preferred variant the identical bit values in the original locally generated bit sequences of member 1 and member 2 are deleted. Member 3 will thus have only information that is not used for generating the key. While it knows that suitably shortened bit sequences result from the local bit sequences of member 1 and member 2 that are different, it does not know which bits member 1 and member 2 have transmitted.

Member 1 and member 2 also have, in addition to the information about the overlapping total bit sequence, the information about the bit sequence locally generated and transmitted by themselves. This information advantage over a member 3 who only follows the public data transmission results in the fact that the keys generated in member 1 and member 2 remain secret as a basis despite the public data transmission.

An attacker (for example, member 3) may also attempt, by transmitting interference signals, to selectively prevent the negotiation of a cryptographic key between member 1 or member 2. Such may be detected by member 1 and member 2, for example, if the key generation (repeatedly) fails. In this case, member 1 or member 2 may abort the key generation and, if necessary, output an error message.

In actual communication systems there may also be the option to draw conclusions about the individual bit sequences $S_{T1}$ and $S_{T2}$ of member 1 and member 2 via precise measurements on the shared transmission medium. Due to the runtime differences, despite a transmission that is supposed to be (largely) synchronous, an attacker (for example, member 3) could receive $S_{T1}$ first and then, shortly thereafter, $S_{T2}$ and then the overlap/linkage $S_{T1}$ and then $S_{T2}$). The attacker thus could draw further conclusions about both sequences. However, depending on the size and type of the shared transmission medium, this would require very accurate and therefore very expensive hardware. For a 4 m long CAN segment, for example, the maximum runtime difference, assuming a wave propagation at the speed of light, is approximately 13 ns.

In order to make such attacks even more difficult, in one preferred variant of the above-described specific embodiments of the method for key generation, it is suggested as a countermeasure that at least one of the two members 1 and 2, in particular, both members, slightly vary the transmission times of their individual signals or individual bits of the bit sequences. Such a variation of the transmission times may take place stochastically, for example. Such a jitter makes it considerably more difficult for a possible attacker, who may be eavesdropping on the public transmission on the transmission channel between member 1 and member 2, to deduce the different start and end points of the transmission of the respective member. A slight variation of the transmission times here means a variation that further ensures that, at the intended sampling times, the corresponding overlaps in the above-described key generation method are soundly distinct. Variation of the transmission times for certain signals or bits is also possible.

An attacker (member 3) may also deduce the origin of certain signals and thus gain information about the locally generated bit sequences of members 1 and 2 from the signal amplitudes during data transmission that are different for member 1 and member 2, and characteristic for the respective member. In a further preferred variant, the transmission amplitudes may be slightly varied (within the allowed tolerances) for the same purpose. This makes it difficult for the attacker (member 3) to assign a signal to one of members 1 or 2 using the different signal amplitudes between member 1 and member 2.

The methods presented herein represent an approach for generating symmetric cryptographic keys between two nodes, making use of the properties of the bit transmission layer. The method is suitable in particular for wire-bound and optical communication systems, as long as they support on-off keying or a bit-by-bit bus arbitration (for example, CAN, TTCAN, CAN-FD, LIN, I2C). However, the method may also be used in wireless communication systems, preferably featuring a very short distance between transmitter and receiver and a possible direct visual connection.

Basically, all communication systems that make a distinction between dominant and recessive bits (as described above) may be used. The methods described herein may thus be used in a plurality of wireless, wire-bound, and optical communication systems. The above-described approach is interesting in particular for machine-to-machine communication, i.e., for transmission of data between different sensors, actuators, etc., which generally have very limited resources and may not be manually configured in the field at a justifiable cost.

Home and building automation, telemedicine, car-to-X systems or industrial automation technology offer further possibilities of application. The application in future nanosensors having wireless interfaces, and in all areas of application of the CAN bus, i.e., in particular, vehicle networking or automation technology is also interesting in particular.

What is claimed is:

1. A method for generating a secret or a key in a network, the network having at least one first and one second member, including a shared transmission channel between at least the first and the second member, the first and second member each being able to place at least one first value and one second value on the transmission channel, the method comprising:
   causing, by the first member, a first member value sequence to be transmitted over the transmission channel;
   causing, by the second member and synchronously with the transmission of the first member value sequence, a second member value sequence to be transmitted over the transmission channel;
   generating, by the first member, a shared secret or a shared key on the basis of information about the first member value sequence and on the basis of an overlap value sequence resulting from an overlap of the first member value sequence with the second member value sequence on the transmission channel; and
   generating, by the second member, the shared secret or the shared key on the basis of information about the second member value sequence and on the basis of an overlap value sequence resulting from the overlap of the first member value sequence with the second member value sequence on the transmission channel;
   wherein the overlap value sequence has a first overlap partial value sequence from the overlap of the first partial value sequences and a second overlap partial value sequence from the overlap of the second partial value sequences, and the first member and the second member link the first overlap partial value sequence with the second overlap partial value sequence, using a logical OR function.

2. The method as recited in claim 1, wherein a state corresponding to the first value is established on the transmission channel if both the first member and the second member cause a transmission of the first value over the transmission channel, and a state corresponding to the second value is established if both the first member or the second member or both cause a transmission of the second value over the transmission channel.

3. The method as recited in claim 1, wherein the first member value sequence and the second member value sequence are generated locally in the first member and in the second member, respectively, using a random generator or a pseudo-random generator.

4. The method as recited in claim 1, wherein the first member value sequence and the second member value sequence have a first partial value sequence and a second partial value sequence, respectively, the second partial value sequence resulting from the first partial value sequence in that first values are changed to second values and second values are changed to first values.

5. The method as recited in claim 1, wherein the first member and the second member derive, from the result of the linkage of the overlap partial value sequences, which positions of their partial member value sequence have a value identical to a value in the same position of the member value sequence of the other member, the first member and the second member deleting these positions and thus obtaining a shortened value sequence.

6. The method as recited in claim 5, wherein the first member inverts its shortened value sequence and thus obtains the shortened value sequence of the second member, and the first member and the second member generate the shared secret or the shared key from their respective shortened value sequences.

7. The method as recited in claim 1, wherein the network is a CAN, TTCAN, CAN-FD, LIN, or I2C bus system, the first value is a recessive bus level, and the second value is a dominant bus level.

8. The method as recited in claim 1, wherein an on-off amplitude shift keying is provided for the data transmission.

9. The method as recited in claim 1, wherein at least one of the first member and the second member vary transmission parameters, the transmission parameters including at least one of: signal transmission time, signal transmission start time, and signal transmission, the transmission parameters being varies during the transmission of their member value sequences.

10. A method for generating a key or a secret in a first member of a network, the first member being set up for receiving information from at least one second member of the network over a transmission channel and for transmitting information to the second member, the first member being set up for placing at least one first value and one second value on the transmission channel and for being able to detect them thereon, the method comprising:
   causing, by the first member, a first member value sequence to be transmitted largely synchronously with a transmission of a second member value sequence by the second member on the transmission channel; and
   generating, by the first member, a secret or a key on the basis of information about the first member value sequence and on the basis of an overlap value sequence, which results on the transmission channel from the overlap of the first member value sequence with the second member value sequence;
   wherein the overlap value sequence has a first overlap partial value sequence from the overlap of the first partial value sequences and a second overlap partial value sequence from the overlap of the second partial value sequences, and the first member and the second member link the first overlap partial value sequence with the second overlap partial value sequence, using a logical OR function.

11. The method as recited in claim 10, wherein the first member and the second member derive, from the result of the linkage of the overlap partial value sequences, which positions of their partial member value sequence have a value identical to a value in the same position of the member value sequence of the other member, the first member and the second member deleting these positions and thus obtaining a shortened value sequence.

12. The method as recited in claim 11, wherein the first member inverts its shortened value sequence and thus obtains the shortened value sequence of the second member, and the first member and the second member generate the shared secret or the shared key from their respective shortened value sequences.

13. A network having at least one first and one second member and a transmission channel over which the first and second members may communicate, comprising:
   a plurality of devices, each of the devices being configured to perform the following:
      causing, by the first member, a first member value sequence to be transmitted over the transmission channel;
      causing, by the second member and synchronously with the transmission of the first member value sequence, a second member value sequence to be transmitted over the transmission channel;
      generating, by the first member, a shared secret or a shared key on the basis of information about the first member value sequence and on the basis of an overlap value sequence resulting from an overlap of the first member value sequence with the second member value sequence on the transmission channel; and
      generating, by the second member, the shared secret or the shared key on the basis of information about the second member value sequence and on the basis of an overlap value sequence resulting from the overlap of the first member value sequence with the second member value sequence on the transmission channel;
   wherein the overlap value sequence has a first overlap partial value sequence from the overlap of the first partial value sequences and a second overlap partial value sequence from the overlap of the second partial value sequences, and the first member and the second member link the first overlap partial value sequence with the second overlap partial value sequence, using a logical OR function.

14. The network as recited in claim 13, wherein the first member and the second member derive, from the result of the linkage of the overlap partial value sequences, which positions of their partial member value sequence have a value identical to a value in the same position of the member value sequence of the other member, the first member and the second member deleting these positions and thus obtaining a shortened value sequence.

15. The network as recited in claim 14, wherein the first member inverts its shortened value sequence and thus obtains the shortened value sequence of the second member, and the first member and the second member generate the shared secret or the shared key from their respective shortened value sequences.

16. A device for generating a key or a secret in a first member of a network, the first member being set up for receiving information from at least one second member of the network over a transmission channel and for transmitting information to the second member, the first member being set up for placing at least one first value and one second value on the transmission channel and for being able to detect them thereon, comprising
   an apparatus configured to perform the following:
      causing, by the first member, a first member value sequence to be transmitted largely synchronously with a transmission of a second member value sequence by the second member on the transmission channel; and
      generating, by the first member, a secret or a key on the basis of information about the first member value sequence and on the basis of an overlap value sequence, which results on the transmission channel from the overlap of the first member value sequence with the second member value sequence;
   wherein the overlap value sequence has a first overlap partial value sequence from the overlap of the first partial value sequences and a second overlap partial value sequence from the overlap of the second partial value sequences, and the first member and the second member link the first overlap partial value sequence with the second overlap partial value sequence, using a logical OR function.

17. The device as recited in claim 16, wherein the first member and the second member derive, from the result of the linkage of the overlap partial value sequences, which positions of their partial member value sequence have a value identical to a value in the same position of the member value sequence of the other member, the first member and the second member deleting these positions and thus obtaining a shortened value sequence.

18. The device as recited in claim 17, wherein the first member inverts its shortened value sequence and thus obtains the shortened value sequence of the second member, and the first member and the second member generate the shared secret or the shared key from their respective shortened value sequences.

19. A non-transitory machine-readable memory medium on which is stored a computer program, which is executable by a processor, comprising:
   a program code arrangement having program code for generating a key or a secret in a first member of a network, the first member being set up for receiving information from at least one second member of the network over a transmission channel and for transmitting information to the second member, the first member being set up for placing at least one first value and one second value on the transmission channel and for being able to detect them thereon, by performing the following:
      causing, by the first member, a first member value sequence to be transmitted largely synchronously with a transmission of a second member value sequence by the second member on the transmission channel; and
      generating, by the first member, a secret or a key on the basis of information about the first member value sequence and on the basis of an overlap value sequence, which results on the transmission channel from the overlap of the first member value sequence with the second member value sequence;
   wherein the overlap value sequence has a first overlap partial value sequence from the overlap of the first partial value sequences and a second overlap partial value sequence from the overlap of the second partial value sequences, and the first member and the second member link the first overlap partial value sequence with the second overlap partial value sequence, using a logical OR function.

20. The non-transitory machine-readable memory medium as recited in claim 19, wherein the first member and the second member derive, from the result of the linkage of the overlap partial value sequences, which positions of their partial member value sequence have a value identical to a value in the same position of the member value sequence of the other member, the first member and the second member deleting these positions and thus obtaining a shortened value sequence.

21. The non-transitory machine-readable memory medium as recited in claim 20, wherein the first member inverts its shortened value sequence and thus obtains the shortened value sequence of the second member, and the first member and the second member generate the shared secret or the shared key from their respective shortened value sequences.

* * * * *